United States Patent [19]
Chambers et al.

[11] Patent Number: 6,016,315
[45] Date of Patent: Jan. 18, 2000

[54] VIRTUAL CONTIGUOUS FIFO FOR COMBINING MULTIPLE DATA PACKETS INTO A SINGLE CONTIGUOUS STREAM

[75] Inventors: Peter Chambers; Scott E. Harrow, both of Scottsdale, Ariz.

[73] Assignee: VLSI Technology, Inc., San Jose, Calif.

[21] Appl. No.: 08/846,294

[22] Filed: Apr. 30, 1997

[51] Int. Cl.[7] .............................. H04L 12/56; H04L 12/50
[52] U.S. Cl. ..................... 370/378; 370/391; 370/414
[58] Field of Search ..................... 370/412, 413, 370/414, 416, 418, 391, 392, 468, 375, 378, 538, 537

[56] References Cited

U.S. PATENT DOCUMENTS

| | | | |
|---|---|---|---|
| 4,759,014 | 7/1988 | Decker et al. | 370/538 |
| 4,910,731 | 3/1990 | Sakurai et al. | 370/413 |
| 5,144,619 | 9/1992 | Munter | 370/353 |
| 5,365,519 | 11/1994 | Kozaki et al. | 370/378 |
| 5,394,397 | 2/1995 | Yanagi et al. | 370/393 |
| 5,426,639 | 6/1995 | Follett et al. | 370/412 |
| 5,570,368 | 10/1996 | Murakami et al. | 370/395 |
| 5,577,037 | 11/1996 | Takatori et al. | 370/395 |

*Primary Examiner*—Chau Nguyen
*Assistant Examiner*—Phuongchau Ba Nguyen
*Attorney, Agent, or Firm*—LaValle D. Ptak

[57] ABSTRACT

A virtual contiguous system for combining multiple and arbitrarily-sized and aligned digital data packets from a PCI bus to a DSP circuit is disclosed. Information from the PCI bus is supplied directly to a plurality of FIFO RAM memory units. Each packet of digital data includes data packet descriptors identifying at least the start address for each data packet and the size of each data packet. The system utilizes this information to operate a read pointer and a write pointer to remove data from the FIFO RAM memory units on a sequential bit-by-bit basis and to supply said data packets to said RAM memory units by means of a write pointer operated by said control circuit. The information transfer is managed on the read side of the FIFO RAM memory units with minimal processing on the write side.

12 Claims, 2 Drawing Sheets

VIRTUAL CONTIGUOUS FIFO FOR COMBINING MULTIPLE DATA PACKETS INTO A SINGLE CONTIGUOUS STREAM

BACKGROUND

Audio digital signal processors typically receive data packets from a 32 bit PCI bus interface. These packets then must be delivered as a single contiguous byte stream to an 8-bit digital signal processor (DSP). The packets are not of fixed byte size and alignment, but instead may be of arbitrary (different) byte size and of different alignment (start byte and end byte address within a 32 bit double word). Data typically is routed through four 8-bit wide RAMs used as first in first out (FIFO) buffers. To accomplish the routing, the traditional implementation is to use a complete 32-bit to 32-bit switch, such that any incoming byte can be routed to any FIFO RAM. A typical design of such a system requires 32 four-to-one multiplexors, or sixteen 8-bit tristate buffers, plus additional control logic, to generate a contiguous 8-bit wide data stream supplied to the DSP data bus.

The steering logic required by the 32-bit to 32-bit switch requires a significant amount of silicon on the integrated circuit chip for the system. In addition, the data steering logic or control logic is somewhat complex.

It is desirable to simplify the circuit design of an audio digital signal processor by eliminating the 32-bit to 32-bit switch and the associated data steering logic.

SUMMARY OF THE INVENTION

A system for combining multiple arbitrarily sized and aligned PCI data packets, of the type used in an audio digital signal processor, into a single contiguous byte stream includes a source of data packets of digital data. The data packets are of arbitrary byte size and alignment. A number of FIFO RAM memory units are coupled in parallel to the source of packets of digital data; and a read pointer is coupled with the RAM memory units to control the reading of data from the units to produce a continuous stream of output data for a DSP data bus. A control circuit is coupled with the stream of output data and with the read pointer to operate the read pointer to cause it to increment the output to the DSP bus on a byte-by-byte basis. A write pointer is also coupled with the RAM memory units to control the writing of data into the units to the location within the FIFO of the next double word (DWORD) to be written by the incoming data. A sequencer circuit is coupled with and is responsive to the control circuit, and is coupled with the write pointer to operate the write pointer for supplying the next double word packet to the FIFO immediately following the previous word which is being removed from the FIFO under the control of the read pointer.

DETAILED DESCRIPTION

Figure 1:
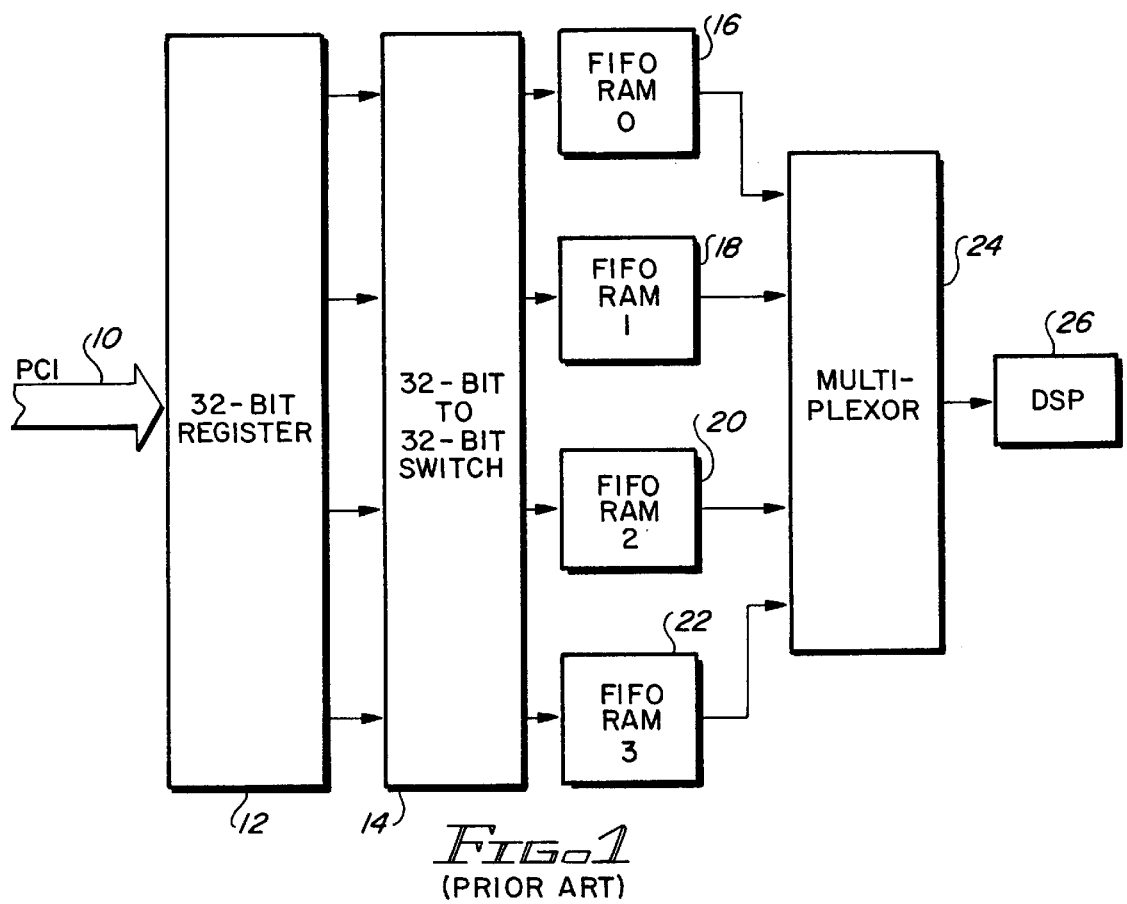
FIG. 1 is a block diagram of a prior art data steering logic for an audio digital signal processor.

Reference now should be made to the drawings in which the same reference numbers are used throughout the different figures to designate the same components. FIG. 1 is a block diagram of a typical steering and control logic system for receiving data packets from a 32-bit PCI bus interface 10, which are to be delivered as a single contiguous byte stream to an audio digital signal processor 26. The data packets are in the form of 32-bit double words (DWORDS); and they may be of arbitrary byte size and alignment. This means that the data packets may have a length of anywhere between four and 256 bytes; and they may begin and end on arbitrary addresses. As a consequence, it is not feasible simply to rotate each DWORD data packet from one FIFO RAM to the next on a sequential basis, because of the potential wide variation in the lengths of the different data packets.

The data packets obtained from the PCI bus 10 are supplied to a 32-bit incoming data register 12. The PCI (peripheral component interconnect) interface develops the 32-bit operands to the register 12 at various times. It is possible for the circuit, however, to accept a 32-bit operand on every clock edge (every 30 ns with a 30 MHz PCI clock source).

Figure 2:
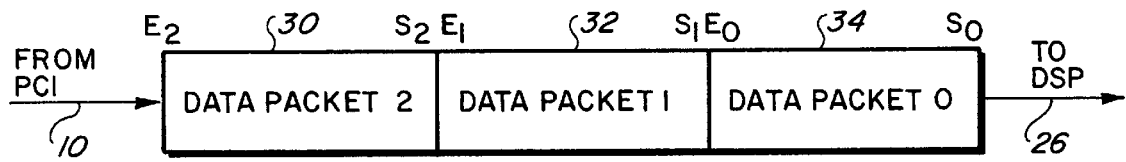
FIG. 2 is a diagram illustrating the organization of data packets used in the system of FIG. 1.

The data packets, as mentioned above, are of arbitrary length (between four and 256 bytes). They may begin and end on arbitrary addresses, but must be seen as a seamless data stream by the DSP 26. This is illustrated in FIG. 2, showing, for purposes of illustration, three data packets "0", "1", and "2" moving from the PCI bus 10 to the DSP 26. $S_0$ is the start address for data packet "0" (34), and $E_0$ is the end address for data packet "0" (34). Packets "1" (reference number 32) and 2 (reference number 30) are numbered similarly with start addresses and end addresses. All of the addresses may be assigned arbitrarily by software to be at any byte location within the system memory.

The 32-bit data from the PCI bus 10, which is placed in the incoming data register 12, then is steered from the register 12 by a switch 14; so that any incoming byte of information may be directed to any one of four (for example) FIFO RAMs 16, 18, 20 and 22. This permits the head of one data packet, such as the packets 30, 32 and 34 of FIG. 2, to be positioned at the byte in the FIFO (16, 18, 20 or 22) which is adjacent the tail of the previous packet. To effect this switching, the 32-bit to 32-bit data switch 14 is employed. Such switches are standard, and typically include either 32 four-to-one multiplexors or sixteen 8-bit tristate buffers. In addition, such a switch 14 requires separate address counters (not shown) for each of the FIFO RAMs 16, 18, 20 and 22, since the address of one of the RAM buffer memories may differ by one long word from any other. This is expensive in terms of silicon area, and complex in terms of system operation.

The outputs of the FIFO RAMs 16, 18, 20 and 22 then are read and supplied through a multiplexor 24 to the DSP 26 in a contiguous order. Thus, the bytes are removed in a continuous chain of digital information, as represented in FIG. 2, but they follow different paths through the different FIFO memories 16, 18, 20 and 22, in accordance with the routing effected by the switch 14.

Details of the various control circuits for implementing the data flow through the circuit of FIG. 1 have not been given, since this is a well known standard system. It should be noted, however, that the "intelligence" for the system of FIG. 1 is on the write side of the FIFO memories 16, 18, 20 and 22. The data switch 14 is used to direct the data appropriately; so that a simple incrementing "read" pointer, controlled by the DSP, may be used to access the FIFO RAMs 16, 18, 20 and 22.

Figure 3:
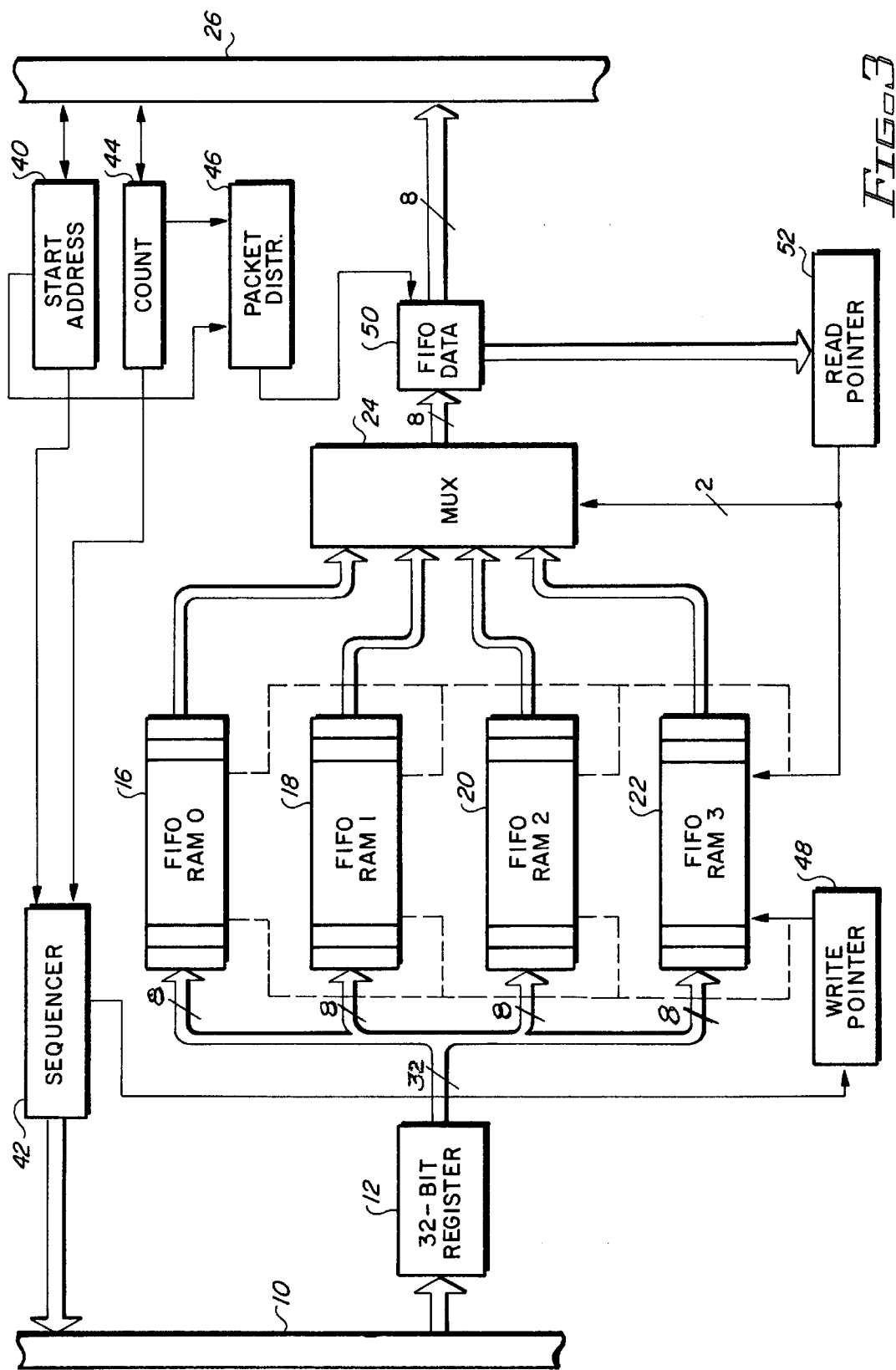
FIG. 3 is a block diagram of a preferred embodiment of the invention.

Reference now should be made to FIG. 3, which is a block diagram of the preferred embodiment of the invention. In the invention shown in FIG. 3, the "intelligence" for the system operation is transferred from the write side of the FIFO memories 16, 18, 20 and 22 to the read side. To do this, a set of data packet descriptors (DPD) is employed to permit parallel loading of the FIFO RAMs 16, 18, 20 and 22 (thus, dispensing with the data switch 14 of FIG. 1). The system then intelligently manipulates read pointers for each of the FIFO RAMs 16, 18, 20 and 22 to access the data correctly.

In the system shown in FIG. 3, the data packets of information from the PCI bus 10 are supplied to the data register 12 in the same manner described in conjunction with the circuit of FIG. 1. The output of the register 12, however, is supplied in parallel directly to the inputs of the four FIFO RAMs 16, 18, 20 and 22. The switch 14 has been eliminated. This is a simple and inexpensive data path. The RAMs 16, 18, 20 and 22 are unloaded as before, through the multiplexor 24 and with the data finally being delivered to the DSP through a FIFO data buffer 50, in 8-bit quantities. It is apparent that the write path is very simple. The intelligence for controlling the transfer of data through the FIFO RAMs 16, 18, 20 and 22 is on the read side of the system.

To effect loading and unloading of data packets of information into the FIFO RAMs 16, 18, 20 and 22, the above mentioned data packet descriptors (DPDs) are employed. In the system described in conjunction with FIG. 3, an implementation employing three DPDs is used; but there is no reason why more or less DPDs may not be used.

Each of the data packet descriptors consists of four fields, namely:
1. START_ADDRESS [31:0]
    START_ADDRESS field is a pointer to the data packet in the system memory. The two least significant bits of this address have special importance for read access to the virtual FIFO, as explained later.
2. PACKET_SIZE [8:0]
    The PACKET_SIZE field is a 9-bit value containing the length, in bytes, of the data packet. In this example, data packets may be between 4 and 256 bytes in length, but larger packets may be accommodated by widening the PACKET_SIZE field. The least two significant bits also have special importance for read access.
3. READ_POINTER [8:0]
    The READ_POINTER initially maintains a byte-address pointer to the location within the FIFO (16, 18, 20 or 22) of the first byte of the data packet. It is incremented on a byte-by-byte basis as data is read from the FIFO by the DSP 26.
4. WRITE_POINTER [6:0]
    The WRITE_POINTER maintains a double word address pointer to the location within the FIFO (16, 18, 20 or 22) of the next double word to be written by incoming data.

The READ_POINTER and WRITE_POINTER fields are not loaded by the DSP 26, but they are assigned automatically by hardware represented by a start address circuit 40, the counter 44, and a packet distributor 46, along with a sequencer 42, shown in FIG. 3.

The manner in which the virtual contiguous FIFO, consisting of the actual hardware FIFO memories 16, 18, 20 and 22, uses the data packet descriptors to write and then read the FIFO (16, 18, 20 and 22) first requires an understanding of how the individual FIFO RAMs 16, 18, 20 and 22 are organized. Consider each of the FIFO RAMs 16, 18, 20 and 22 as a set of four 8-bit by 128-bit RAMs, with read and write pointers. This is illustrated in FIG. 3 by indicating a limited number of sections or address positions in the RAMs 16, 18, 20 and 22 by vertical lines at each end of each of the RAM memories 16, 18, 20 and 22. A write pointer 48 is indicated as connected to variable positions in each of the four RAMs 16, 18, 20 and 22; and a read pointer 52 also is illustrated as connected to variable or different positions in each of the FIFO RAM memories 16, 18, 20 and 22 by means of the output arrows connected from the write pointer 48 and read pointer 52, as illustrated in FIG. 3.

The read pointer 52 is byte-oriented, since bytes are read one at a time from the output multiplexor 24. The write pointer is double-word (DWORD) oriented, since only complete double words are written into the FIFO consisting of the four FIFO RAMs 16, 18, 20 and 22.

The DSP 26 configures the virtual FIFO consisting of the FIFO RAMs 16, 18, 20 and 22 for a data packet by writing the data packet descriptor and then initiating, through the DSP bus 26, the PCI data transfers. The two fields of the DPD are determined as follows: the START_ADDRESS [31:0] described earlier gives the byte address within the system memory of the first byte of the data packet. This is supplied from the data bus 26 to the start address circuit 40, and from there to the packet distributor 46 through a FIFO data block 50 to the read pointer 52. This establishes the specific start address for the next data packet to be supplied to the multiplex 24 from a selected one of the FIFO RAM memories 16, 18, 20 or 22. In the illustration shown in FIG. 3, this address is illustrated as in the FIFO RAM 22 by the solid line connection from the read pointer 52. Dotted line connections for the other FIFO RAM memories 16, 18 and 20 are shown, illustrating the circuit path or control path effected from the read pointer 52 when information stored in any of those sections of the FIFO memory is to be supplied to the multiplex 24.

The data packet descriptor (DPD) also includes the PACKET_SIZE [8:0] which contains the exact length of the data packet, in bytes. Thus, the system is provided with the information necessary to transfer the exact amount of information out of the FIFO RAM 22 corresponding to the data packet being read and supplied to the multiplex 24. The information concerning the data packet is supplied from the DSP data bus to a counter 44 to establish a countdown count indicative of when the data packet has been fully transferred. The output of the counter 44 is supplied to the packet distributor 46 to control the operation of the read pointer 52 through the FIFO data circuit 50.

As described above, the read pointer 52 is directed by the packet distributor 46 to the byte address within the particular one of the FIFO RAMs 16, 18, 20 or 22 for the first byte of the data packet. The two least significant bits of this field (READ_POINTER [1.0]) are the same as the START_ADDRESS [1:0].

The write pointer 48 is controlled by the sequencer 42, which in turn is controlled by the start address circuit 40 and the counter 44 to assign the next DWORD address within the FIFO RAMs 16, 18, 20 and 22, which will be written as the next DWORD is loaded into the selected one of the FIFO RAMs 16, 18, 20 or 22. This is always initialized to the next available completely empty DWORD in any one of the sections 16, 18, 20 or 22 of the FIFO RAM.

When the data packets shown in FIG. 2 are read from the system memory 16, 18, 20 or 22, the two least significant address bits are set to 00, and only double words are read. These double words are written into the FIFO at the location pointed to the write pointer 48, as described above. After each transaction, the system memory address and the write pointer are both incremented to the next DWORD address.

It should be noted that at the start of any transaction, the read pointer 52 (READ_POINTER [8:2]) is the same as the write pointer 48 (WRITE_POINTER [6:0]). That is, the DWORD address from the read pointer 52 is the same as that of the write pointer 48. The difference between the two is that the read pointer also includes the information required to point to the first byte of the data packet (READ_POINTER [1:0]).

The system controlled as described above operates as follows: the write pointer 48 (WRITE_POINTER [6:0]) is initialized to the next available DWORD within the FIFO RAMs 16, 18, 20 or 22. This is important, since only complete 32-bit DWORDS are read from the system memory or register 12 and written into the FIFO RAM 16, 18, 20 and 22. Consequently, there may be empty space in the FIFO between the end of one data packet and the beginning of the next. This empty space may be up to six bytes in length. This ensures that the write pointer 48 always starts with an empty DWORD and guarantees that good data (specifically, the tail end of the preceding data packet) is never overwritten. Data always is read from the system register 12 in DWORDS, regardless of alignment of the start and end of the data packets. This means that there may be up to three "don't care" bytes written at the start and end of the data packets, such as the data packets 30, 32 and 34, shown in FIG. 2, depending upon the particular byte alignment. At the end of each data packet, the DSP 26 is notified by the PCI master through the PCI bus 10 that the transfer is complete and all data has been successfully written into the FIFO RAM 16, 18, 20 and 22. The manner in which this is accomplished is conventional and, therefore, is not disclosed in FIG. 3 to avoid unnecessary cluttering of the drawing and unnecessary description of a standard technique.

When the data has been stored in the FIFO RAM in any one of the sections 16, 18, 20 and 22,, it is read in accordance with the operation of the read pointer 52. The read pointer 52 is initialized through the packet distributor 46 and the FIFO data circuit 50 to the exact byte location within the FIFO 16, 18, 20 and 22 of the first byte of the data packet which is to be transferred through the multiplex 24 to the DSP bus 26. It should be noted that READ_POINTER [1:0] are the same as START_ADDRESS [1:0], while READ_POINTER [8:2] are the same as the initial value of WRITE_POINTER [6:0]. Data is read from the FIFO 16, 18, 20 and 22 by using the read pointer 52. READ_POINTER [8:2] selects a DWORD location to read from the appropriate one of the FIFO RAMs 16, 18, 20 and 22, as described earlier. At the same time, READ_POINTER [1:0] selects one byte via the multiplexor 24. Bytes are read in the correct order simply by incrementing the read pointer 52 until the end of the data packet is reached. This is determined by the counter 44 in accordance with the data packet length used to set the counter 44 at the beginning of the data packet through information supplied through the DSP data bus 26.

In the example which has been described in conjunction with FIGS. 2 and 3, three data packet descriptors (DPD) are utilized. All three DPDs may be active simultaneously, with one data packet being accessed by the DSP bus 26, one data packet sitting complete and ready to be accessed by the DSP bus 26, and one data packet being written into the FIFO 16, 18, 20 or 22 by the PCI master through the information supplied on the PCI data bus 10 through the register 12. The management of the three DPDs is under software control, but is effected in accordance with the sequence of operation described above in conjunction with FIG. 3.

The foregoing description of the preferred embodiment of the invention illustrates a flexible extensible efficient mechanism to manage the flow of arbitrarily sized and aligned data packets through a FIFO to produce a contiguous stream of byte data. No large data switches are required; and the use of the DPD structure ensures a reliable control of data. Since all of the data packets end and begin at adjacent DWORDS, the system initializes the read pointer 52 and the write pointer 48 for one packet by examining the pointer from the previous packet. After a system reset, all pointers are initialized to zero, thus pointing to the beginning of the FIFO.

The foregoing description of the preferred embodiment of the invention is to be considered as illustrative and not as limiting. Various changes will occur to those skilled in the art for performing substantially the same function, in substantially the same way, to achieve substantially the same result without departing from the true scope of the invention as defined in the appended claims.

What is claimed is:

1. A system for combining multiple arbitrarily sized and aligned data packets into a single contiguous byte stream including in combination:

a source of packets of digital data which are of arbitrary different byte sizes;

a plurality of FIFO RAM memory units coupled in parallel to said source of packets of digital data;

a read pointer coupled with said RAM memory units for controlling the reading of data therefrom to produce a continuous stream of output data;

a control circuit responsive to said stream of output data and coupled with said read pointer to operate said read pointer;

a write pointer coupled with said RAM memory units for controlling the writing of data into said RAM memory units; and a sequencer circuit coupled with and responsive to said control circuit and further coupled with said write pointer to operate said write pointer.

2. A system according to claim 1 wherein each of said data packets includes data packet descriptors (DPDs) including at least the start address for said data packet and a packet size descriptor containing the length of the data packet in bytes; and said control circuit responding to said DPDs to operate said read pointer to remove said data packets from said FIFO RAM memory units and for directing said write pointer to the next available empty word within the FIFO RAM memory units without overwriting information at the end of the preceding data packet.

3. The system according to claim 2 wherein said read pointer sequentially controls removal of a data packet from said FIFO RAM memory units in a continuous byte-by-byte sequence.

4. The system according to claim 3 further including a digital signal processor (DSP) and a multiplexor, with said multiplexor coupled to the outputs of said FIFO RAM memory units for supplying said continuous byte stream of information from said data packets to said DSP.

5. The system according to claim 4 wherein said data packets are supplied from a PCI data bus and further including an input register, having its input coupled with said PCI data bus and its output coupled in parallel with each of said FIFO RAM memory units.

6. The system according to claim 2 wherein said control circuit includes a counter responsive to a DPD indicative of said packet size for operating said read pointer and said write pointer to transfer data out of said FIFO RAM memory units and to transfer data packets into said FIFO RAM memory units without overwriting data in said FIFO RAM memory units over previously stored data packets being removed from said FIFO memory units under control of said read pointer.

7. The system according to claim 6 wherein said data packets are supplied from a PCI data bus and further including an input register, having its input coupled with said PCI data bus and its output coupled in parallel with each of said FIFO RAM memory units.

8. The system according to claim 7 wherein said read pointer sequentially controls removal of a data packet from said FIFO RAM memory units in a continuous byte-by-byte sequence.

9. The system according to claim 1 wherein said data packets are supplied from a PCI data bus and further including an input register, having its input coupled with said PCI data bus and its output coupled in parallel with each of said FIFO RAM memory units.

10. The system according to claim 9 further including a digital signal processor (DSP) and a multiplexor, with said multiplexor coupled to the outputs of said FIFO RAM memory units for supplying said continuous byte stream of information from said data packets to said DSP.

11. The system according to claim 10 wherein said read pointer sequentially controls removal of a data packet from said FIFO RAM memory units in a continuous byte-by-byte sequence.

12. A method for combining multiple, arbitrarily-sized and aligned digital data packets of information into a single contiguous stream comprising the steps of:

obtaining different sized data packets of 32-bit DWORDS from a PCI data source;

supplying said data packets in parallel to a plurality of FIFO RAM memory units;

adding data packet descriptors to each data packet to identify at least the start address for such data packet and the packet size, in bytes, of the data packet;

using said data packet descriptors to operate a read pointer to sequentially remove data from said FIFO RAM memory units on a byte-by-byte basis for utilization by a data system processor;

responding to said data packet descriptors to control a write pointer for writing a new data packet into said FIFO RAM memory units based on said data packet descriptors for said start address and said packet size for the previous packet to prevent overwriting of data by said new data packet.

* * * * *